(12) United States Patent
Westervelt

(10) Patent No.: US 12,709,250 B1
(45) Date of Patent: Aug. 18, 2026

(54) SYSTEM FOR CONTROLLING A BRAKE SYSTEM OF A TOWED VEHICLE

(71) Applicant: N.S.A. RV PRODUCTS, INC., Iola, KS (US)

(72) Inventor: Tod Westervelt, Gas, KS (US)

(73) Assignee: N.S.A. RV PRODUCTS, INC., Iola, KS (US)

( * ) Notice: Subject to any disclaimer, the term of this patent is extended or adjusted under 35 U.S.C. 154(b) by 0 days.

(21) Appl. No.: 19/057,071

(22) Filed: Feb. 19, 2025

(51) Int. Cl.
*B60T 7/04* (2006.01)
*F16C 1/10* (2006.01)

(52) U.S. Cl.
CPC ................ *B60T 7/04* (2013.01); *F16C 1/103* (2013.01)

(58) Field of Classification Search
CPC ..... B60T 7/02; B60T 7/04; B60T 7/20; B60T 11/04; B60T 11/046; F16C 1/10; F16C 1/103; F16C 1/105; B60D 1/242; G05G 1/487
See application file for complete search history.

(56) References Cited

U.S. PATENT DOCUMENTS 1,353,379 A * 9/1920 Caulfeild ............. B60W 10/02 74/481
4,428,613 A * 1/1984 Nomura ................ B60T 11/046 74/533
6,626,504 B2 * 9/2003 Harner ...................... B60T 7/20 303/7
10,077,034 B2 * 9/2018 Sanders .................. B60T 8/171
10,421,441 B2 * 9/2019 Sanders ................ B60T 13/662
10,604,125 B2 * 3/2020 Graham .................... B60T 7/20
2013/0238205 A1 * 9/2013 Edwards ................. B60T 17/02 74/108
2021/0046916 A1 * 2/2021 Patterson ................ B60T 11/18
2024/0198988 A1 * 6/2024 Jiang ......................... B60T 7/06

FOREIGN PATENT DOCUMENTS

CN 112977367 A * 6/2021 ................ B60T 7/06
DE 9311293 U1 * 1/1994

* cited by examiner

*Primary Examiner* — Adam D Rogers

(57) ABSTRACT

A towed vehicle brake control system includes a cable having a first end and a second end, the first end of the cable configured to be secured to a brake pedal of the towed vehicle and the second end configured to be secured at or through a front of the towed vehicle. A cable floor clamp of the towed vehicle brake control system has a body securable to the towed vehicle, at least one channel extending through a length of the body, with each at least one channel having an opening at opposing ends of the channel, and one or more rollers secured to the body along an axis perpendicular to the length of the body. The cable is configured to extend through one of the channels of the body and against one of the rollers.

16 Claims, 5 Drawing Sheets

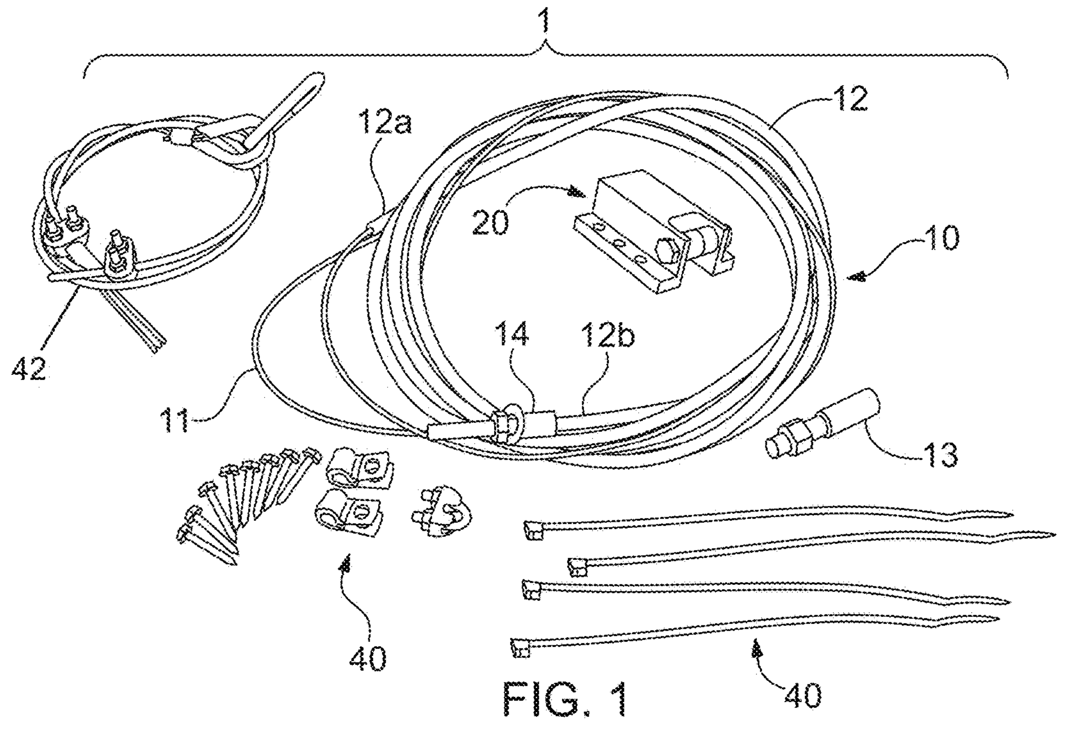
FIG. 1
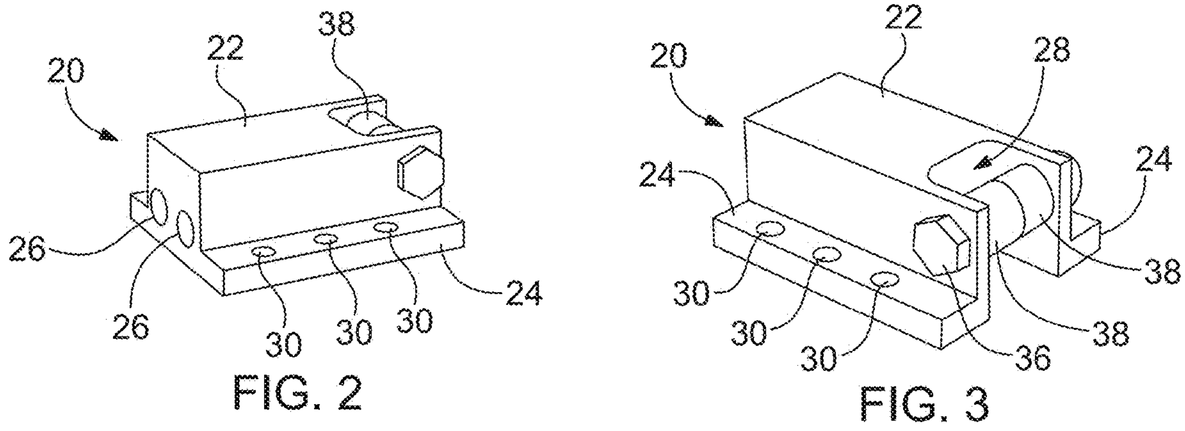
FIG. 2
FIG. 3

13
11b
11
F

SYSTEM FOR CONTROLLING A BRAKE SYSTEM OF A TOWED VEHICLE

CROSS-REFERENCE TO RELATED APPLICATIONS

Not applicable.

STATEMENT REGARDING FEDERALLY SPONSORED RESEARCH

Not applicable.

PARTIES TO A JOINT RESEARCH AGREEMENT

Not applicable.

INCORPORATION BY REFERENCE

Not applicable.

STATEMENT REGARDING PRIOR DISCLOSURE

Not applicable.

BACKGROUND OF THE INVENTION

The present invention relates to a system installed in a towed vehicle to control the braking system of the towed vehicle from a towing vehicle. More specifically, the systems includes a cable attached at a first end to a brake pedal of the towed vehicle and secured through a cable floor clamp and through a floor of the towed vehicle, with a second end of the cable secured at or through a front of the towed vehicle.

Prior art break control systems for controlling the breaks of a towed vehicle extend through the firewall along the driver side of the vehicle and into the engine compartment. Such systems then extend through the engine compartment and to the front of the towed vehicle. This is a problem discovered in the inventor, whose customers complained about having to install such a system through the engine compartment. Each vehicle make and model has a different configuration in its engine compartment, but all are densely packed with parts. The inventor provides a novel improvement to the art that avoids the engine compartment.

BRIEF SUMMARY OF THE INVENTION

A preferred embodiment of the invention includes a towed vehicle brake control system, having a cable having a first end and a second end, the first end of the cable configured to be secured to a brake pedal of the towed vehicle; a cable floor clamp having a body securable to the towed vehicle, at least one channel extending through a length of the body, each said at least one channel having an opening at opposing ends of the channel, and one or more rollers secured to the body along an axis perpendicular to the length of the body, wherein the cable is configured to extend through a channel of the at least one channel of the body and against one roller of the one or more rollers and be secured at or through a front of the towed vehicle.

The towed vehicle brake control system may also have at least one channel that has a threaded portion.

The towed vehicle brake control system may further comprise a cable conduit secured around and along a length of the cable.

The towed vehicle brake control system may also have the cable conduit comprising a threaded portion at a first end of the cable conduit configured to secure the cable conduit to the threaded portion of said at least one channel of the body of the cable floor clamp.

The towed vehicle brake control system may also have the cable conduit further comprising a second threaded portion secured at a second end of the cable conduit configured to secure the cable conduit to the front of the towed vehicle such that the second end of the cable is accessible from the front of the towed vehicle.

The towed vehicle brake control system of claim may also further comprise fasteners configured to secure the cable conduit to an inside floor of the towed vehicle and/or an outside bottom of the towed vehicle.

BRIEF DESCRIPTION OF THE SEVERAL VIEWS OF THE DRAWINGS

The invention will be better understood with reference to the following drawings:

FIG. 1 shows a view of the separate elements of a towed vehicle brake control system;

FIG. 2 shows a back perspective view of a cable floor clamp of the towed vehicle brake control system of FIG. 1;

FIG. 3 shows a front perspective view of the cable floor clamp of FIG. 2;

DETAILED DESCRIPTION OF THE INVENTION

Figure 8:
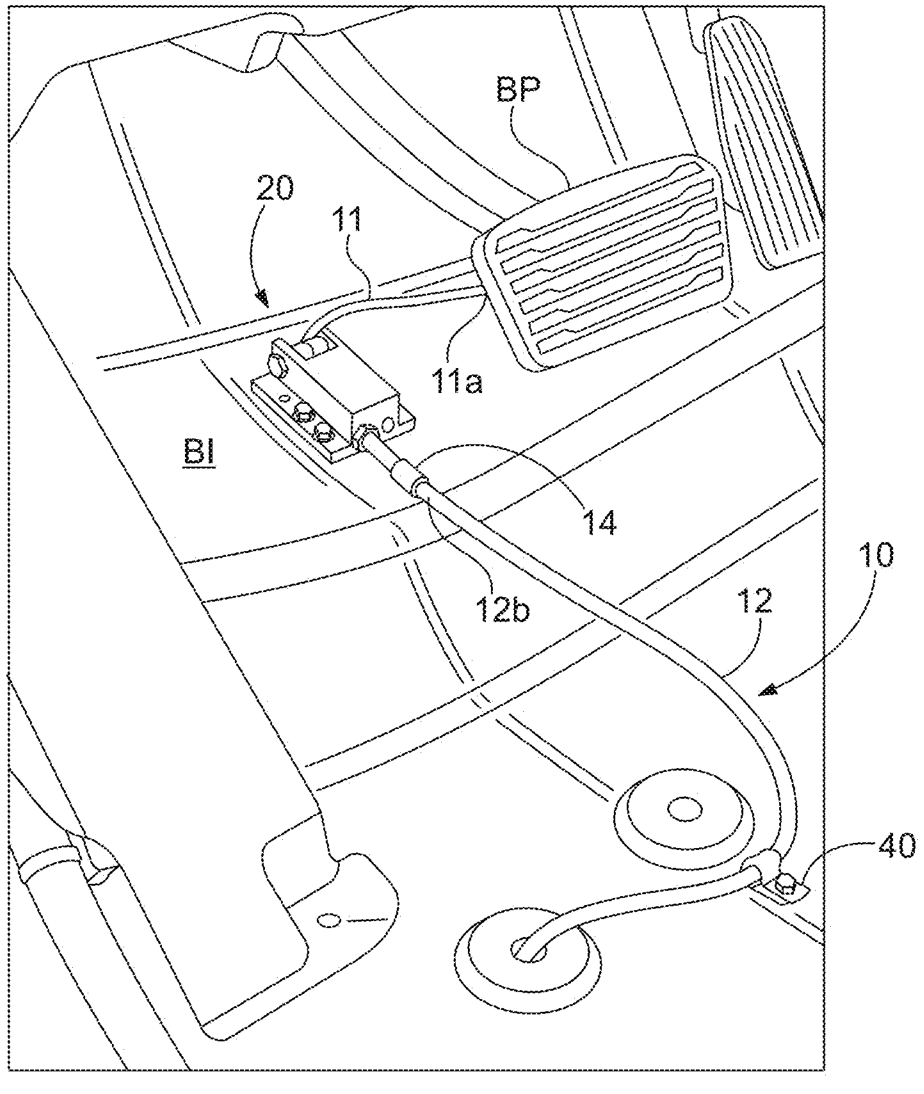
FIG. 8 shows the towed vehicle brake control system of FIG. 1 installed in a towed vehicle.
Figure 9:
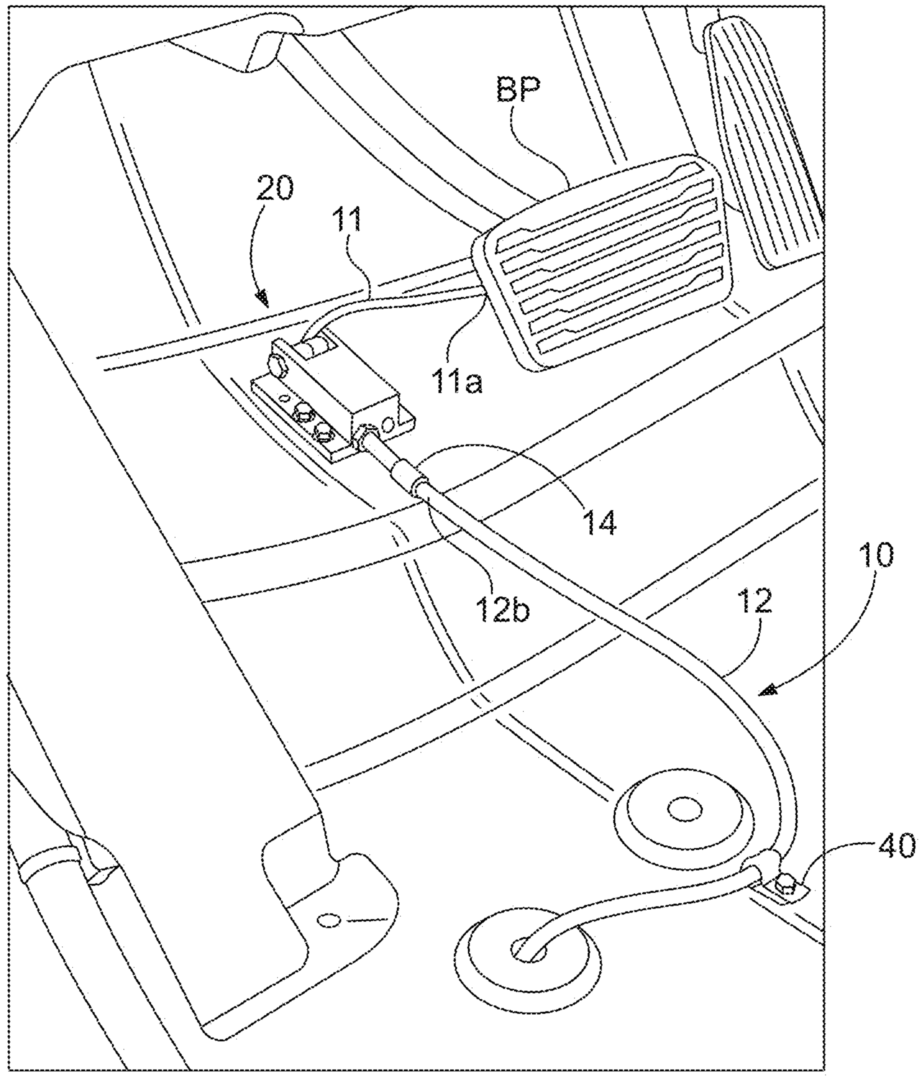
FIG. 9 shows an enlarged view of the towed vehicle brake control system of FIG. 8.
Figures 10, 11:
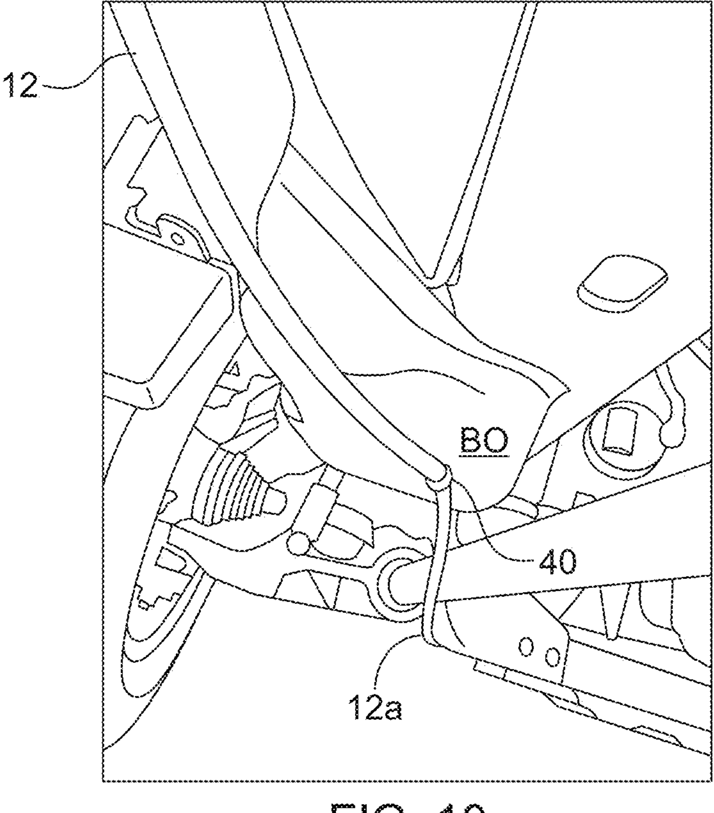
FIG. 10 shows a view of underneath the towed vehicle with a cable conduit of the towed vehicle brake control system of FIG. 1 attached to the towed vehicle.
FIG. 11 shows a front view of the towed vehicle and a cable of the towed vehicle brake control system of FIG. 1.

FIG. 1 shows a towed vehicle brake control system 1 including a cable assembly 10, a cable floor clamp 20, and fasteners 40. The cable assembly 10 includes a cable 11, a cable conduit 12, and conduit fasteners 13 and 14. The cable 11 is a heavy-duty cable, preferably aircraft cable. A first end 11*a* of the cable is configured to be attached to a brake pedal BP, preferably via a fastener, as shown in FIGS. 8 and 9. A second end 11*b* of the cable is configured to be movably secured along a front F of the towed vehicle, as shown in FIG. 11.

The cable conduit 12 sheathes a length of the cable 11, preferably less than the entire length of the cable. The cable conduit 12 may be made of metal, metal alloy, plastic, woven natural or synthetic material, or a combination thereof. The conduit fastener 14 is secured at a first end 12*b* of the cable conduit 12. The conduit fastener 14 is preferably made of metal but may be made of plastic or other known materials for fasteners. In the preferred embodiment of the invention, the conduit fastener 14 includes a threaded element securable in a corresponding threaded hole of the cable floor clamp 20. The conduit fastener 13 is secured to a second end 12*a* of the cable conduit 12, opposite to the first end 12*b*, and preferably made of a plastic material but may be made from metal or other known materials for fasteners. In the preferred embodiment of the invention, conduit fastener 13 includes a hollow threaded element that is insertable through a hole along the front F of the towed vehicle and secured to the front by a nylon nut secured along the threaded element.

FIGS. 2-7 show multiple views of the cable floor clamp 20, with FIGS. 4-7 showing the cable floor clamp without the rollers 38 and roller fastener 36. The cable floor clamp 20 includes a body 20 having one or more channels 26 extending along a length L of the body. In the preferred embodiment of the cable floor clamp 20, there are two channels 26 positioned side-by-side and extending along a length L of the body 22. Each channel 26 in the preferred embodiment is a hole having opposing openings 26*a* and 26*b*. Each channel 26 also has a threaded portion 32 extending along a length of the channel adjacent to opening 26*b* to interact with and secure the threaded conduit fastener 14 to the cable floor clamp 20.

Figure 4:
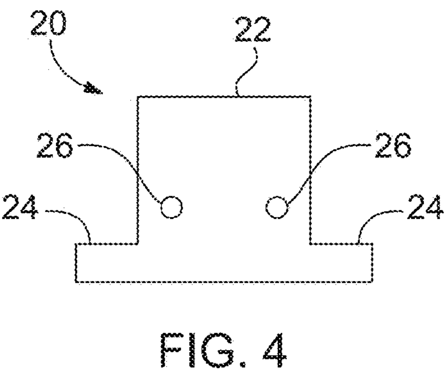
FIG. 4 shows a back view of the cable floor clamp of FIG. 2.
Figure 5:
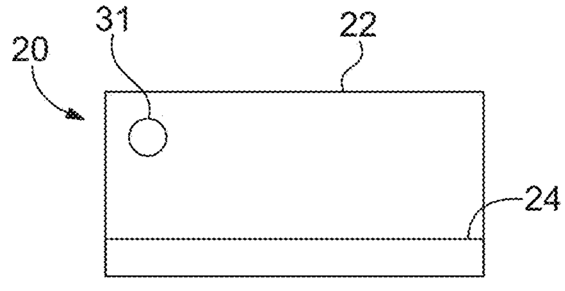
FIG. 5 shows a side view of the cable floor clamp of FIG. 2.
Figure 6:
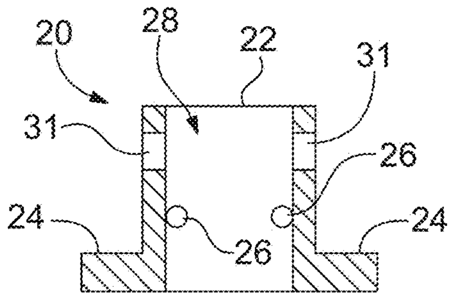
FIG. 6 shows a front cross-sectional view of the cable floor clamp along axis A provided in FIG. 7.
Figure 7:
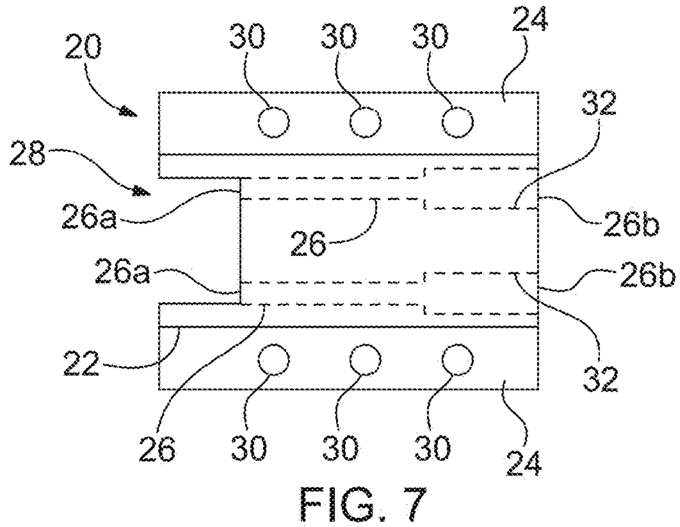
FIG. 7 shows a top view of the cable floor clamp of FIG. 2.

Members 24, as shown best in FIGS. 4, 6, and 7, extend horizontally and away from the body 22 on either longitudinal side of the body near a bottom of the body. Each member 24 extends the entire length L of the body 22 in the preferred embodiment, but may extend only a partial length L of the body in other embodiments. Each member 24 expands the surface area of the cable floor clamp 20 to help stabilize a bottom surface of the clamp against a floor or inside surface BI of the towed vehicle. Each member 24 has one or more holes 30, as shown in FIG. 7, through which fasteners are passed to secure to and/or through the floor BI of the towed vehicle. In the preferred embodiment, each member 24 includes three holes 30. Fasteners used to secure the cable floor clamp 20 to the floor BI via holes 30 are typically threaded fasteners, including nuts and bolts, but could be any other fastener typically used in the automotive industry.

Two lips or flanges 29 extending from the body 22 define a space 28 at one end of the cable floor clamp 20. Each lip 29 has a vertically extending hole 31, with the hole of each lip being coaxial. One or more rollers 38 are secured between the two lips 29 such that each roller rotates coaxially with an axis through the holes 31. The rollers 38 may be secured between the lips 29 by a rod, bolt and nut, or similar fastener 36. The openings 26A of the channels 26 are located in the space 28 created by the lips 29. This space 28 is defined by a U-shaped or three-sided surface created by inner surfaces of each of the two flanges 29 and the body 22.

One or more fasteners 40 may be used to secure the cable conduit 12 to the towed vehicle, either along the floor BI or to the frame on the bottom outside BO. These fasteners are typically conduit straps, pipe clamps, loop straps, conduit hangers, or other similar fasteners for securing pipes or piping to a surface. Zip ties may also be used where appropriate.

When installed in a towed vehicle the cable floor clamp 20 is secured to the floor BI inside of the towed vehicle via fasteners through holes 30 of the horizontally extending members 24. The cable conduit 12 is secured to the cable floor clamp 20 at end 12*b* via the conduit fastener 14 threadingly engaging the threaded portion 32 of a channel 26. The cable conduit 12 extends through a pre-existing hole in the floor BI of the towed vehicle or a drilled hole in the floor to an exterior of the towed vehicle. The portion of the cable conduit 12 outside of the towed vehicle extends underneath the towed vehicle and towards a front F of the towed vehicle and may be secured to a bottom BO of the towed vehicle via one or more fasteners 40. The cable conduit 12 is secured to the front F of the towed vehicle via the conduit fastener 13 at end 12*a* of the cable conduit. The cable 11 extends within and throughout the cable conduit 12 and past the cable conduit ends 12*a* and 12*b* and fasteners 13 and 14. A washer, U-clamp, or similar fastener may be attached to the cable 11 near its ends 11*a* and 11*b*, adjacent to each of conduit fasteners 13 and 14, to prevent the cable from retracting past the conduit fasteners 13 or 14, and into the length of the cable conduit 12. Such fasteners can be attached to the ends 11*a*, 11*b* of the cable 11 to create looped ends capable of attaching to other structures, including the brake pedal BP. The cable 11 also extends past conduit fastener 14 and through the cable floor clamp 20 via a channel 26 and openings 26*a* and 26*b*. The cable 11 extends around the rollers 38 and up and back past the cable floor clamp 20 to attach to the shaft of a brake pedal BP. The cable 11 and cable conduit 12 do not pass through the engine compartment of the towed vehicle.

The cable floor clamp 20 is installed on the floor BI of the towed vehicle in front of the foot pad of the brake pedal BP, and the end 11*a* of the cable 11 is preferably secured as close as possible to the foot pad along the pedal shaft, to create optimal leverage for the brake control system 1 to move the brake pedal in response to force pulling end 11*b* of the cable 11. The cable 11 rests against the rollers 38, which then rotate in response to forces acting on either end 11*a*, 11*b* of the cable and moving the cable back and forth.

When end 11*b* of the cable 11 is pulled out and away from the front F of the towed vehicle, end 11*a* of the cable pulls the brake pedal down to engage the braking system of the towed vehicle. Once the force acting to pull the end 11*b* of the cable 11 is removed, the inherent force of the brake pedal BP of the towed vehicle to release and move the brake pedal up and toward the driver's seat returns the cable 11 and ends 11*a*, 11*b* to their original position. In this manner, the end 11*b* of the cable 11 can be attached to a system installed in a towing vehicle to simultaneously engage and disengage both the braking system of the towing vehicle and the towed vehicle.

An extender cable 42 is attachable to end 11*b* of the cable 11 to extend to the towing vehicle, if needed.

The specific embodiments described above have been provided by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

I claim:

1. A towed vehicle brake control system, comprising:

a cable having a first end and a second end, the first end of the cable configured to be secured to a brake pedal of the towed vehicle;

a cable floor clamp having a body securable to the towed vehicle, at least one channel extending through a length of the body, each said at least one channel having an opening at opposing ends of the channel, and one or more rollers secured to the body along an axis perpendicular to the length of the body, wherein the cable is configured to extend through a channel of the at least one channel of the body and against one roller of the one or more rollers and be secured at or through a front of the towed vehicle, and wherein each said at least one channel has a threaded portion.

2. The towed vehicle brake control system of claim 1, further comprising a cable conduit secured around and along a length of the cable.

3. The towed vehicle brake control system of claim 2, wherein the cable conduit comprises a threaded portion at a first end of the cable conduit configured to secure the cable conduit to the threaded portion of said at least one channel of the body of the cable floor clamp.

4. The towed vehicle brake control system of claim 3, wherein the cable conduit further comprises a second threaded portion secured at a second end of the cable conduit configured to secure the cable conduit to the front of the towed vehicle such that the second end of the cable is accessible from the front of the towed vehicle.

5. The towed vehicle brake control system of claim 2, further comprising fasteners configured to secure the cable conduit to an inside floor of the towed vehicle and/or an outside bottom of the towed vehicle.

6. The towed vehicle brake control system of claim 1, wherein the cable floor clamp further includes members that extend horizontally and away from the body on either longitudinal side of the body.

7. The towed vehicle brake control system of claim 6, wherein each member of the members includes one or more holes through which fasteners are securable to secure the cable floor clamp to the towed vehicle.

8. A towed vehicle brake control system, comprising:

a cable having a first end and a second end, the first end of the cable configured to be secured to a brake pedal of the towed vehicle;

a cable floor clamp having a body securable to the towed vehicle, at least one channel longitudinally extending through the body, each said at least one channel having an opening at each opposing end of the channel, and one or more rollers secured to the body along an axis perpendicular to the length of the body, wherein the cable is configured to extend through a channel of the at least one channel of the body and against one roller of the one or more rollers and be secured at or through a front of the towed vehicle, wherein two flanges longitudinally extend from the body of the cable floor clamp and define a space in which the one or more rollers are rotatably secured, and wherein each said at least one channel has one opening along an end of the opposing ends of the body inside the space defined by the two flanges.

9. The towed vehicle brake control system of claim 8, wherein the cable floor clamp further includes members that extend horizontally and away from the body on either longitudinal side of the body.

10. The towed vehicle brake control system of claim 9, wherein each member of the members includes one or more holes through which fasteners are securable to secure the cable floor clamp to the towed vehicle.

11. The towed vehicle brake control system of claim 8, wherein each said at least one channel has a threaded portion.

12. The towed vehicle brake control system of claim 11, wherein the threaded portion of each said at least one channel is adjacent to the opening along an end of the opposing ends opposite to the two flanges.

13. The towed vehicle brake control system of claim 11, further comprising a cable conduit secured around and along a length of the cable.

14. The towed vehicle brake control system of claim 13, wherein the cable conduit comprises a threaded portion at a first end of the cable conduit configured to secure the cable conduit to the threaded portion of said at least one channel of the body of the cable floor clamp.

15. The towed vehicle brake control system of claim 14, wherein the cable conduit further comprises a second threaded portion secured at a second end of the cable conduit configured to secure the cable conduit to the front of the towed vehicle such that the second end of the cable is accessible from the front of the towed vehicle.

16. The towed vehicle brake control system of claim 15, further comprising fasteners configured to secure the cable conduit to an inside floor of the towed vehicle and/or an outside bottom of the towed vehicle.

* * * * *